US009032622B2

(12) United States Patent
Hancock et al.

(10) Patent No.: US 9,032,622 B2
(45) Date of Patent: May 19, 2015

(54) METHODS OF MANUFACTURING WIND TURBINE BLADES

(75) Inventors: Mark Hancock, Southampton (GB); Anton Bech, Ringkøbing (DK); Rens Christiaan Verhoef, Ringkøbing (DK); Adrian Gill, East Cowes (GB); Karl Gregory, Cowes (GB)

(73) Assignee: Vestas Wind Systems A/S, Aarhus N. (DK)

( * ) Notice: Subject to any disclaimer, the term of this patent is extended or adjusted under 35 U.S.C. 154(b) by 552 days.

(21) Appl. No.: 13/323,238

(22) Filed: Dec. 12, 2011

(65) Prior Publication Data

US 2012/0246931 A1 Oct. 4, 2012

Related U.S. Application Data

(60) Provisional application No. 61/490,381, filed on May 26, 2011.

(30) Foreign Application Priority Data

Mar. 30, 2011 (DK) .................................. 2011 70151

(51) Int. Cl.
*B21D 53/78* (2006.01)
*F03D 1/06* (2006.01)
*B23P 15/04* (2006.01)
*F01D 5/28* (2006.01)

(52) U.S. Cl.
CPC .............. *F03D 1/0675* (2013.01); *B21D 53/78* (2013.01); *F01D 5/282* (2013.01); *B23P 15/04* (2013.01); *F05B 2230/00* (2013.01); *Y02E 10/721* (2013.01)

(58) Field of Classification Search
CPC ......... B23P 15/04; B23P 15/02; B21D 53/78; F01D 5/282; F03D 1/0675; Y02E 10/721

USPC ................. 29/889.21, 889.7, 889.71, 889.72, 29/525.01, 525.13, 525.15; 416/226, 233, 416/210 R, 209, 238, 239
See application file for complete search history.

(56) References Cited

U.S. PATENT DOCUMENTS 3,356,153 A * 12/1967 Schramm J et al. .......... 416/226
2009/0196755 A1 8/2009 Peace et al.

FOREIGN PATENT DOCUMENTS

WO 2010/023140 3/2010
WO 2010092168 A2 8/2010
(Continued)

OTHER PUBLICATIONS
Sanne H. Skovborg Jørgensen; 1st Technical Examination and Search Report issued in priority Denmark Application No. PA 2011 70151; Nov. 16, 2011; 6 pages; Denmark Patent and Trademark Office.
(Continued)

*Primary Examiner* — Ryan J Walters
(74) *Attorney, Agent, or Firm* — Wood, Herron & Evans, LLP

(57) ABSTRACT

An elongate web is attached to the root end of a spar of a wind turbine rotor blade to provide additional support along the width of the blade. The root end is formed by a winding operation, and a recess is then cut into the surface of the spar. The recess is defined by a relatively large first, cylindrical surface, which is coaxial with the longitudinal axis of the root end, and a relatively small second, conical surface. A tapered end of the elongate web is attached within the recess of the root end using a layer of suitable adhesive and an array of pins. Resilient spacer elements are arranged within the recess so as to surround the pins. The large area of the cylindrical surface causes the tensile and compressive stresses which arise along the elongate web in use to be transmitted to the spar as shear stresses.

16 Claims, 7 Drawing Sheets

(56) References Cited

FOREIGN PATENT DOCUMENTS

| WO | WO 2010092168 A2 * | 8/2010 | ............... F03D 1/06 |
| WO | 2012019611 A2 | 2/2012 | |

OTHER PUBLICATIONS

European Patent Office, Extended European Search Report issued in corresponding European Application No. 11194121.7, dated Mar. 7, 2014, 8 pages.

* cited by examiner

METHODS OF MANUFACTURING WIND TURBINE BLADES

CROSS-REFERENCE TO RELATED APPLICATIONS

This application claims priority under 35 U.S.C. §119(a) to DK Application No. PA 2011 70151, filed Mar. 30, 2011. This application also claims the benefit of U.S. Provisional Application No. 61/490,381, filed May 26, 2011. Each of these applications is incorporated by reference herein in its entirety.

TECHNICAL FIELD

Aspects of the present invention relate to methods of manufacturing rotor blades for wind turbines, and in particular to such methods where the rotor blade contains an additional web.

BACKGROUND

A typical horizontal-axis wind turbine is illustrated in FIG. 1. The wind turbine 1 comprises a tower 2, a nacelle 3 mounted at top of the tower 2 and a rotor 4 operatively coupled to a generator 5 within the nacelle 3. The wind turbine 1 converts kinetic energy of the wind into electrical energy. In addition to the generator 5, the nacelle 3 houses the various components required to convert the wind energy into electrical energy and also the various components required to operate and optimize the performance of the wind turbine 1. The tower 2 supports the load presented by the nacelle 3, the rotor 4 and other wind turbine components within the nacelle 3.

The rotor 4 includes a central hub 6 and three elongate rotor blades 7a, 7b, 7c of approximately planar configuration which extend radially outward from the central hub 6. In operation, the blades 7a, 7b, 7c are configured to interact with the passing air flow to produce lift that causes the central hub 6 to rotate about its longitudinal axis. Wind exceeding a minimum level will activate the rotor 4 and allow it to rotate within a plane substantially perpendicular to the direction of the wind. The rotation is converted to electric power by the generator 5 and is usually supplied to the utility grid.

A known rotor blade for such a wind turbine comprises a hollow spar which serves to transfer loads from the rotor blade to the hub of the wind turbine. Such loads include tensile stresses directed along the length of the blade arising from the circular motion of the blade and stresses arising from the wind which are directed along the thickness of the blade, i.e. from the windward side of the blade to the leeward side. In addition, gravitational stresses arise within the blade in approximately the edgewise (or chordwise) direction, i.e. directed from the leading edge of the rotating blade to the trailing edge, when the blade is directed away from the vertical, and these are most pronounced when the blade is horizontal. When the leading edge is above the trailing edge, these stresses are tensile in the leading edge, and when the leading edge is below the trailing edge, the stresses are compressive in the leading edge.

Finally, in a plane approximately perpendicular to the blade chordwise axis, aerodynamic loads are generated across the blade surface due to wind interaction which result in bending loads being directed in the opposing flatwise faces of the blade. The sense of the loads is such that, under steady wind loads, the windward blade faces is generally in tension and the leeward blade faced is generally in compression.

Throughout the present specification, the term "leading edge" refers to the edge of the rotor blade which hits the air during rotation of the blade, and the term "trailing edge" refers to the opposite edge.

The spar may be formed as a single integral structure by a winding a length of fibre around a mandrel. Alternatively, the spar may be formed from two or more, e.g. four, webs which are joined together to form the hollow structure. In order to mitigate the problem of the gravitational stresses mentioned above, an additional elongate web may be attached to the spar so as to increase the stiffness of the rotor blade in the chordwise direction, and thereby improve the ability of the rotor blade to transfer load in the chordwise direction. A first end of the additional web is attached to the root end of the blade, i.e. the end which will be attached to the hub of the wind turbine. The additional web extends away from the spar within the trailing edge of the rotor blade, and is optimally placed in the chordwise sense to provide both increased stiffness to the rotor blade in the chordwise direction and to provide support against buckling for the windward and leeward face panels by reducing their effective spans.

The elongate additional web also serves to increase the stiffness of the rotor blade along its longitudinal axis.

The spar, or each individual web of the spar, is typically manufactured by winding glass fibre or other suitable fibre around a mandrel. One problem which arises is how to manufacture a spar having an external surface which allows the additional web to be attached at the desired angle. This not only requires the attachment surface to have the desired orientation relative to the longitudinal axis of the spar but also requires the attachment surface to be of an area sufficient to prevent the additional web from becoming detached from the spar in use, when it is subjected to the severe stresses mentioned above.

It would be possible to form the desired surface on the spar by a complex winding operation which involves the insertion of one or more suitable formers during the winding process such that the subsequent windings form a surface having the desired configuration.

However, such a process is time-consuming, since the winding operation must be interrupted to permit the formers to be inserted. Furthermore, it is not a straightforward matter to form certain surfaces, such as concave surfaces using a winding process.

It would therefore be desirable to provide a method of manufacturing a wind turbine blade which overcomes, or at least mitigates, the above disadvantages.

SUMMARY

In accordance with aspects of the present invention, there is provided a method of manufacturing a wind turbine blade, the method comprising: providing a spar; forming a recess in the outer surface of the spar; and attaching one end of an elongate web within the recess of the spar.

The spar, preferably a primary load bearing member of the blade, presents a root end at which it is later attached to a hub of the wind turbine rotor. Preferably, close to the root end, i.e., between the root end and up to a distance from the root end corresponding to, for example, 2% of the length of the spar, the spar has circular cross-sections for creating an interface with the hub. Preferably, as the distance from the root end increases, in a transition region, the circular cross-sections gradually turns into substantially rectangular cross-sections, and the length of the transition region can be, for example, 20% of the length of the blade. Herein, the portion of the spar that presents the circular cross-sections and the transition region, is referred to as a root end portion. The length of the root end portion can be 2-50%, preferably 5-40%, more preferably 10-30%, or even more preferably 15-25%, of the length of the spar. The root end portion can be provided as a separate component to which the remainder of the spar can be attached at a later stage, or it can be provided already attached to, or integral with, the remainder of the spar.

By forming a recess in the outer surface of the root end portion of the spar as provided, there is no need for the root end portion of the spar to be manufactured with a suitable recess already formed in the surface. Where the root end portion is formed by a winding process, as described above, the efficiency of the winding process increases, since there is no need for the recess to be formed as part of the winding process. Furthermore, the attachment surface can be formed with an optimal configuration.

The recess can be formed by removing a part of the spar, preferably by removing a part of the root end portion of the spar, e.g., by cutting.

The recess is advantageously shaped so as to have a first, substantially cylindrical surface which is substantially coaxial with the longitudinal axis of the root end portion and preferably also a second, substantially conical surface formed between the first, cylindrical surface and the outer surface of the root end portion.

The provision of a first surface approximately parallel to the centreline of the root end portion of the spar enables the elongate web to be attached to the root end portion such that, in use, edgewise bending of the blades is transmitted from the web to the spar as shear loads. A major technical advantage of this arrangement is that bonded joints are typically stronger when subject to shear stresses than with tensile stresses. Furthermore, the stress load transfer is both more evenly spread and generally lower than with bolted joints.

The elongate web is preferably formed with a tapered root end having a part-cylindrical surface which is complementary to the substantially cylindrical surface of the recess in the root end portion. This serves to optimise the surface area of contact between the elongate web and the root end portion of the spar.

The first surface of the recess is substantially greater than the area of the second surface of the recess, so as to maximise the interface between the elongate web and the root end portion of the spar for the transmission of shear stresses.

The elongate web may be attached to the root end portion using an adhesive. However, it is preferred that the elongate web is attached to the root end portion using one or more pins, preferably in addition to using an adhesive. The pin or pins serve to prevent both the formation and propagation of cracks in the resulting structure which could result in peeling of the elongate web from the surface of the root end portion as a result of tensile stresses directed along the axis of the rotor blade. When more than two pins are used, they are preferably arranged in a regular array. The pin or pins are preferably made from a composite, e.g., glass composite, or metallic material and advantageously exhibit a relatively high axial stiffness, but a relatively low bending stiffness, so as to prevent the elongate web from lifting away from the surface of the root end portion of the spar but allowing a small degree of sliding movement between the web and the root end portion.

In an exemplary embodiment, one or more resilient sealing elements, preferably made from an elastomeric material, are provided between the elongate web and the root end portion within the region of the outermost pins, (i.e., the pins that ate farthest away from the root end). The sealing elements could for example be such as those presented in WO2010023140. The sealing elements serve at least five functions: (a) the sealing elements control the unsupported length of the pins over which the pins can bend to a limited extent to accommodate small shear strains between the elongate web and the root end portion; (b) when an adhesive layer is present, the sealing elements constitute a barrier for the adhesive; (c) the sealing elements may be provided with convex edges which, when an adhesive is present, ensure a good fillet along the edge of the cured adhesive; (d) when pins are used, the sealing elements provide reinforcement against splintering of the under-surface of the elongate web during the drilling of the holes for the pins; and (e) the sealing elements protect the edge of the adhesion layer from degradation by aggressive environmental agents such as salt, chemicals, oils, dirt and ice.

Embodiments of the invention also provide a method of joining two components, e.g., a wind turbine blade spar and an elongate web, the method comprising positioning a layer of adhesive for an intended joint between the components, positioning along an edge of the intended joint a sealing element to limit the extension of the adhesive, placing the components adjacent each other with the adhesive and sealing element between them, and then providing, e.g., by drilling, at least one hole extending through the components and the sealing element, and then providing, e.g., bonding or driving, an elongated device, e.g., a pin, through the hole, i.e., so that the elongated device extends from one component, through the sealing element and to the other component on the other side of the sealing element.

BRIEF DESCRIPTION OF THE DRAWINGS

Preferred embodiments of the present invention will now be described with reference to the accompanying drawings, in which.

DETAILED DESCRIPTION

Figure 1:
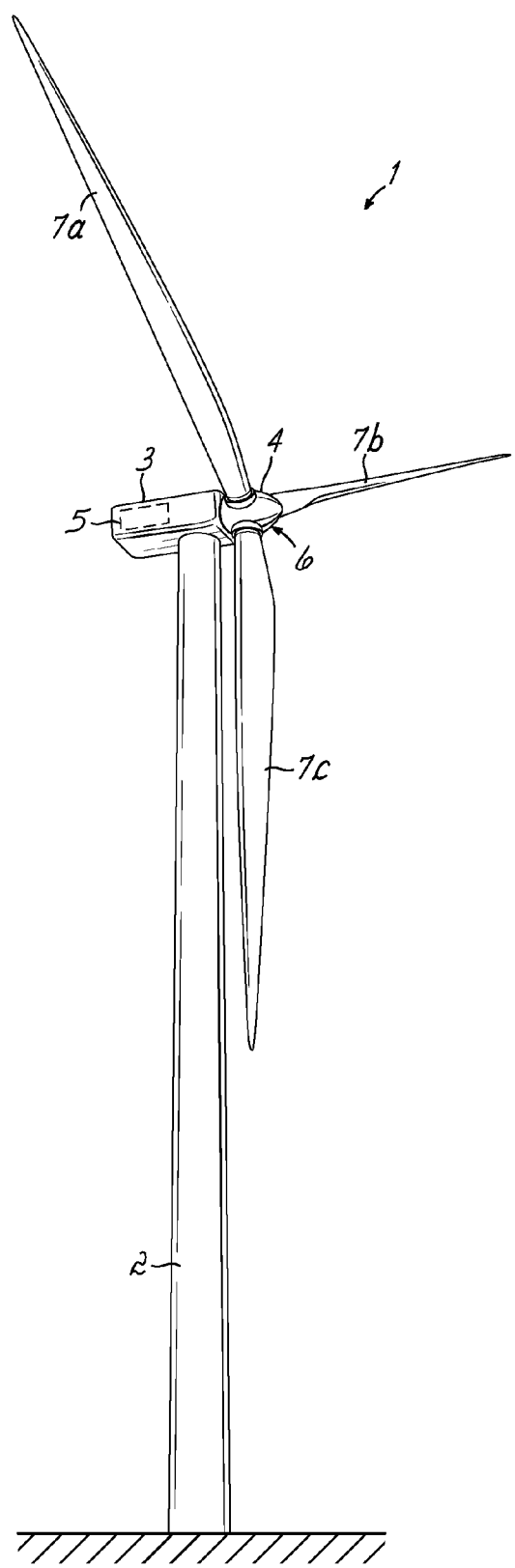
FIG. 1 illustrates the main structural components of a wind turbine.
Figure 2:
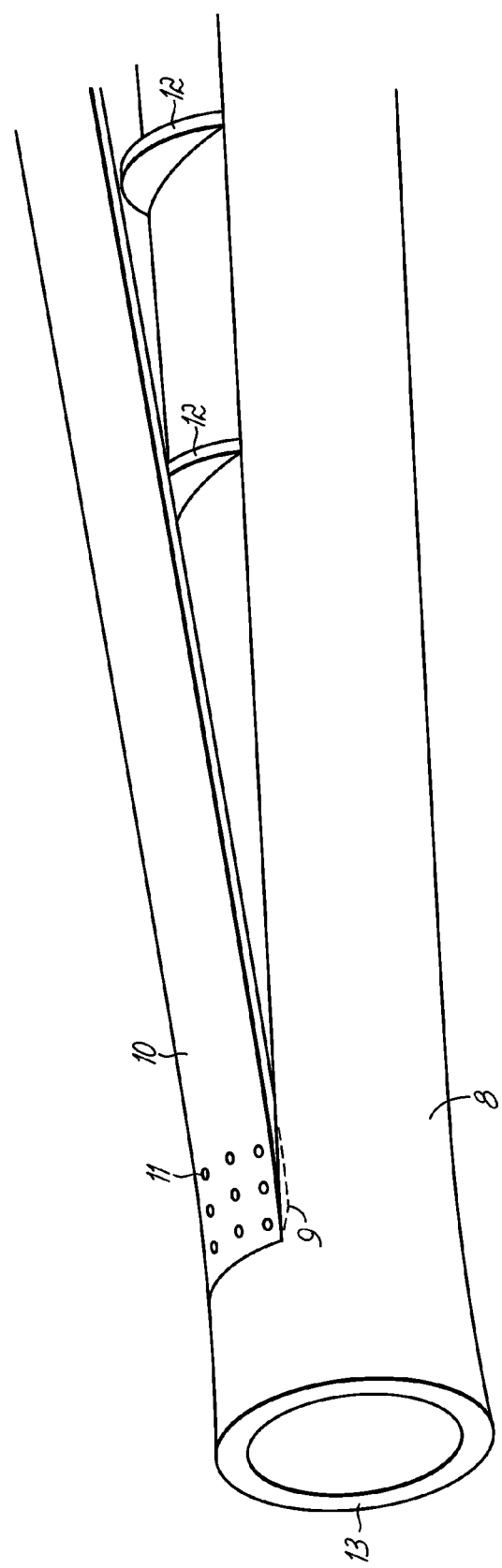
FIG. 2 illustrates a wind turbine blade manufactured in accordance with a preferred embodiment of the present invention.

Referring to FIG. 2, an elongate spar 8 of a wind turbine rotor blade, made by winding a length of fibre of a suitable material such as glass around a mandrel, is formed with a recess 9 after completion of the winding process. An elongate web 10 is attached within the recess 9 of the spar 8 using a combination of adhesive and an array of pins 11. A number of spacer elements 12 may be connected between the spar 8 and the additional web 10 to provide support for the additional web 10. The root end 13 of the spar 8, shown at the left-hand side of the drawing, is attached to the central hub of the wind turbine. From the root end and up to a certain distance from the root end, the spar presents what is herein referred to as a root end portion, in which as explained above the spar has circular cross-section, and a region with cross-sections in a transition from circular to rectangular.

Figure 3:
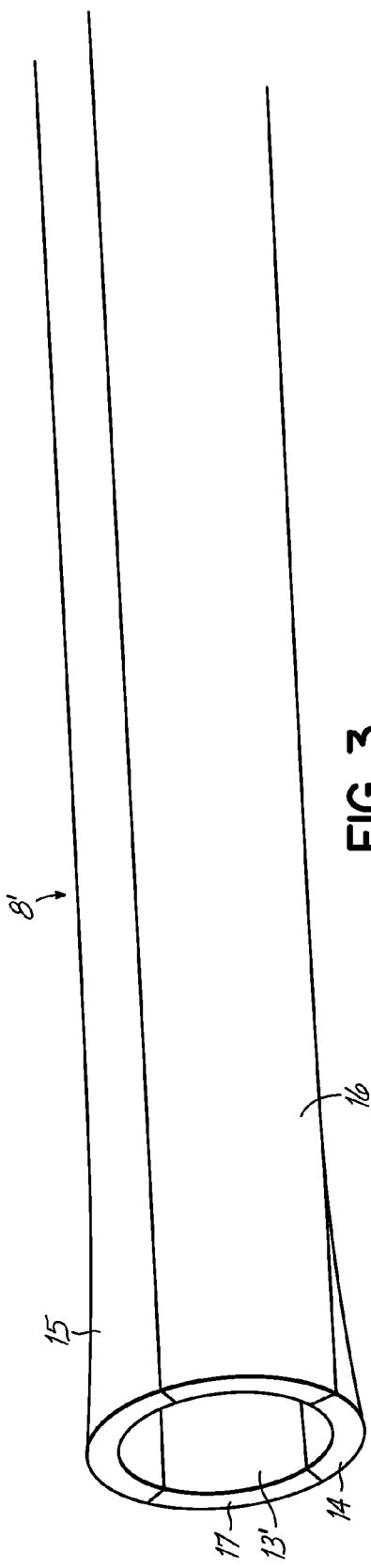
FIG. 3 illustrates a known type of spar made from four separate webs.

FIG. 3 illustrates an elongate quadrant spar 8' which is similar to the spar 8 shown in FIG. 2, but is formed from four discrete components, namely a leading edge web 14, a trailing edge web 15, a windward cap 16 and a leeward cap 17. The four components 14, 15, 16, 17 are joined together using a suitable adhesive. As with the spar 8 shown in FIG. 2, the root end 13' of the spar 8', is attached to the central hub of the wind turbine.

Figure 4:
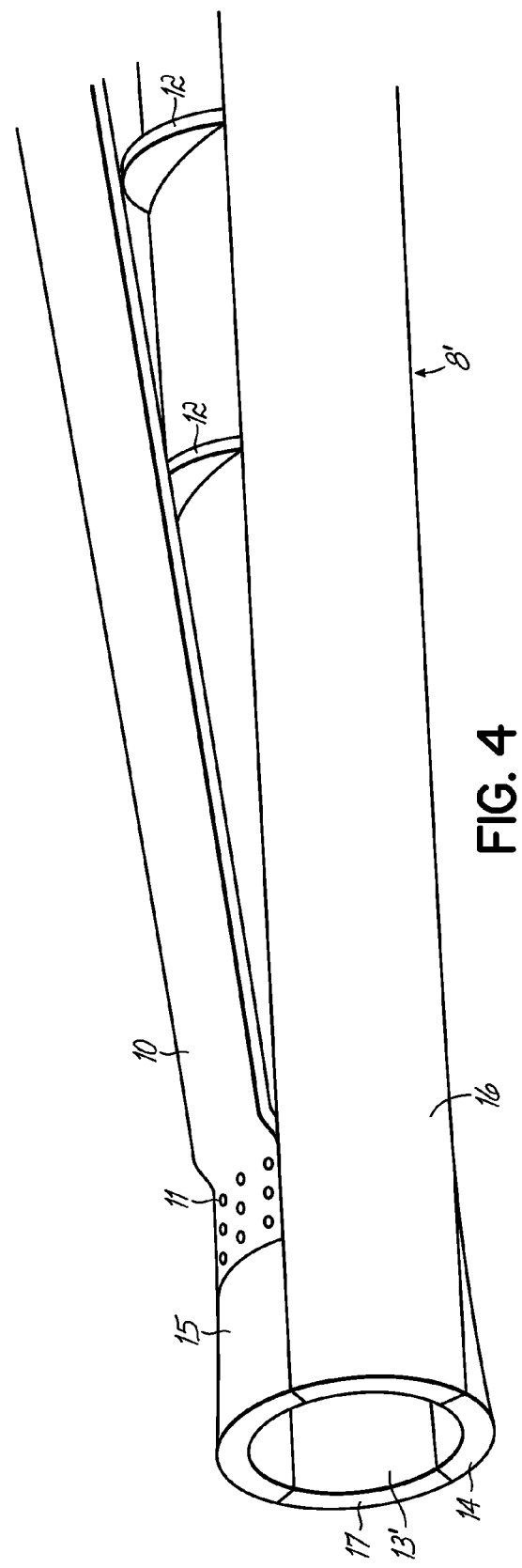
FIG. 4 illustrates the spar of FIG. 3 to which an elongate web has been attached in accordance with an alternative embodiment of the present invention.

As shown in FIG. 4, in which the same reference numerals as in FIG. 2 are used to indicate the same components, an additional elongate web 10 is attached to the trailing edge web 15 of the spar, again using a combination of adhesive and pins 11, and spacer elements 12 may be connected between the trailing edge web 15 and the additional web 10 to provide support for the additional web 10.

Figure 5A:
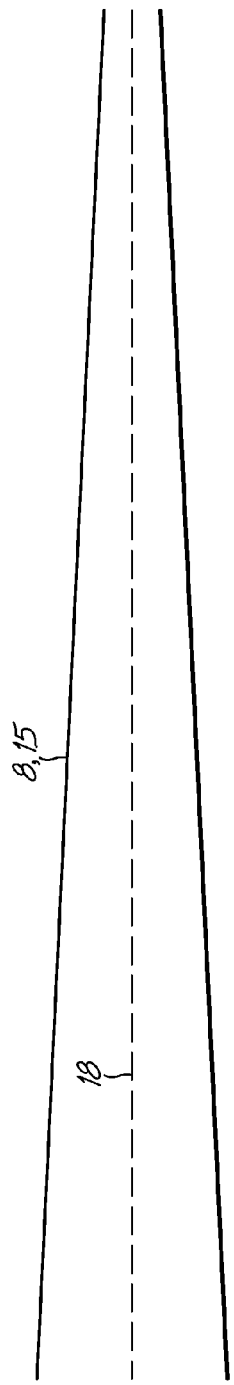
FIGS. 5A to 5C are cross-sectional views illustrating the process steps of attaching the elongate web to the spar.
Figure 5B:
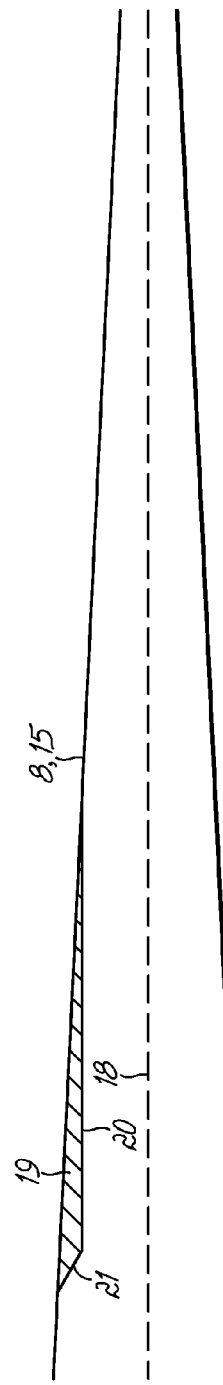

The process of attaching the additional web 10 to either the spar 8 of FIG. 2 or the quadrant-type spar 8' of FIGS. 3 and 4 will now be described with reference to the cross-sectional representations shown in FIGS. 5A to 5C. FIG. 5A illustrates the spar 8 or trailing edge web 15 as supplied. The longitudinal axis 18 of the spar 8, 8' is indicated by a dashed line. FIG. 5B shows a recess 19 which is formed in the spar 8 or trailing edge web 15 by machining, e.g., milling. The recess 19 is defined by a first surface 20, which is generally cylindrical and coaxial with the spar 8, 8', as indicated in the cross-sectional drawing by the surface 20 running parallel to the longitudinal axis 18, and a second surface 21, which is generally conical and which acts as a transition surface between the first surface 20 and the outer surface of the spar 8, 8'. When the recess 19 is formed in the trailing edge web 15 of the quadrant-type spar 8', the recess extends across the full width of the trailing edge web 15. The side edges of the recess 19, i.e., the edges running parallel to the longitudinal axis of the spar 8, 8', are chamfered over a distance of e.g., 20 mm so as to reduce the concentration of stresses at the sides of the recess 19.

Figure 5C:
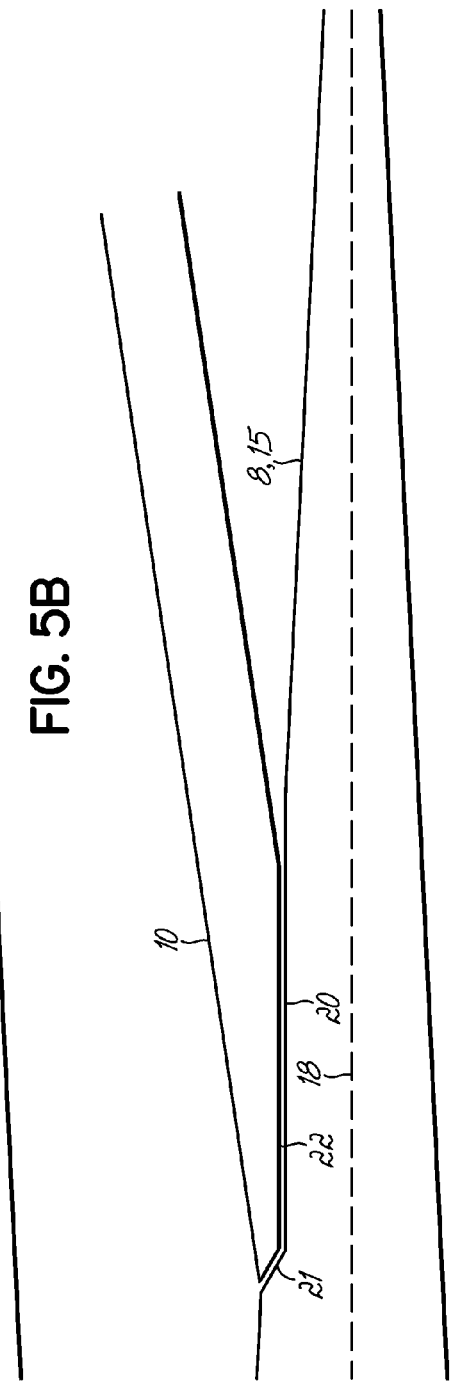

As shown in FIG. 5C, one end 22 of the additional longitudinal web 10 is then attached to the recess 19, as described in greater detail below. The end 22 is tapered such that, when flush against the first surface 20 of the recess 19, the additional web 10 extends from the spar 8 or trailing edge web 15 in the desired direction.

Figure 6:
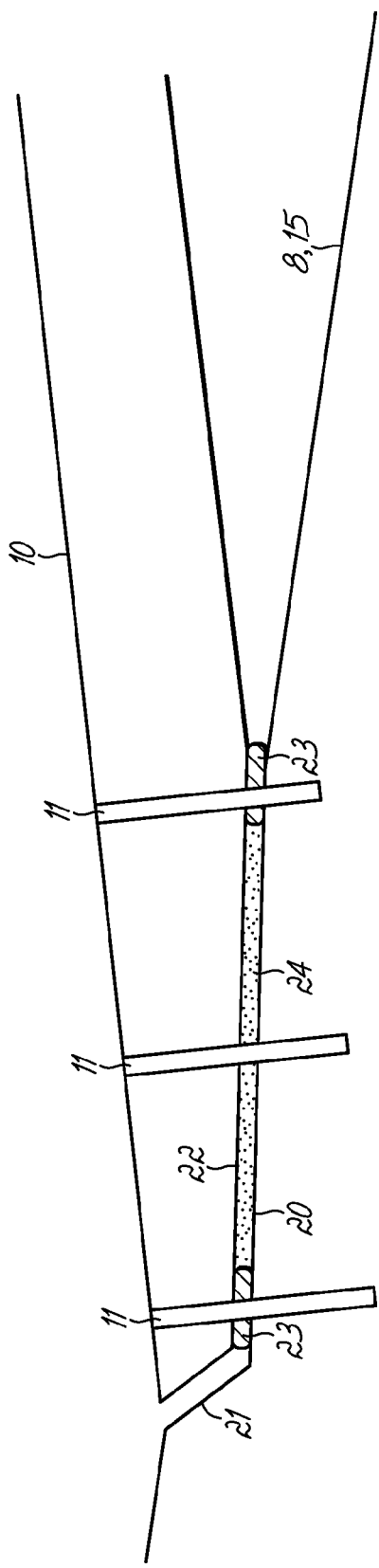
FIG. 6 is a cross-sectional view illustrating the use of pins to secure the elongate web to the spar in accordance with a preferred embodiment of the present invention.

FIG. 6 is a cross-sectional illustration of an exemplary method of attaching the additional web 10 to the spar 8 or trailing edge web 15. Elongate sealing elements 23, (forming lines extending perpendicularly to the plane of the drawing), made from a suitable elastomeric material and formed with convex edges, are placed on the first surface 20 of the recess 19, at the two edges of the elongate web attachment bond line that are closest and farthest away, respectively, from the root end 13. Also, a layer of adhesive 24 is applied between the sealing elements 23. The additional web 10 is then moved into position in the recess 19 with its tapered end 22 abutting the first surface 20 of the recess 19. With the additional web 10 attached to the spar 8 or trailing edge web 15, lines of e.g., thirty-two holes are then drilled through the additional web 10 and into the spar 8 or trailing edge web 15 along the centre lines of the elongate sealing elements 23. It should be noted that additional holes may be drilled between the external bonding edges. The holes are drilled in a direction substantially perpendicular to the outer surface of the additional web 10. Lines of dowel pins 11 of e.g., 8 mm diameter, are then bonded or driven into the respective holes so as to provide additional strength to the bond between the additional web 10 and the spar 8 or trailing edge web 15. The pins 11 are formed from a glass composite material, or may alternatively be made of a suitable metal, and have a degree of bending flexibility but high tensile strength. The pins 11 are provided with a fluted surface, i.e., having longitudinal ridges extending along the outer surfaces of the pins.

The pins 11 have sufficiently flexibility to withstand the shear stresses which will be borne by the layer of adhesive 24, but have sufficient tensile strength to inhibit lifting of the additional web 10 away from the spar 8, 8'.

The row of pins 11 closest to the root end 13 and the row of pins 11 farthest away from the root end 13 serve to reinforce the external edges of the adhesive layers 24 against tensile peel forces which would tend to cleave the bonded joint, and the internal row of pins 11 serves to prevent the propagation of any cracks which form at the external edges of the adhesive layers 24.

The sealing elements 23 serve a number of functions. Firstly, they provide a barrier between the adhesive 24 and the atmosphere, which not only prevents undesirable egress of the adhesive 24 before it is cured but which also prevents contamination of the adhesive 24 by ingress of water, ice and other debris which could lead to degradation of the adhesive bond. Secondly, the convex edges of the sealing elements 23 provide a bulbous interface between the sealing elements 23 and the uncured adhesive 24 to ensure a good fillet along the cured edges of the adhesive 24. Thirdly, the sealing elements 23 define the length of the pins 11 which is unsupported and along which the pin is able to bend to accommodate small relative movements between the additional web 10 and the spar 8, 8'. Fourthly, the sealing elements 23 provide a support for the underlying surface of the additional web 10 during the drilling of the holes and which therefore inhibits splintering of the additional web 10.

Figure 7:
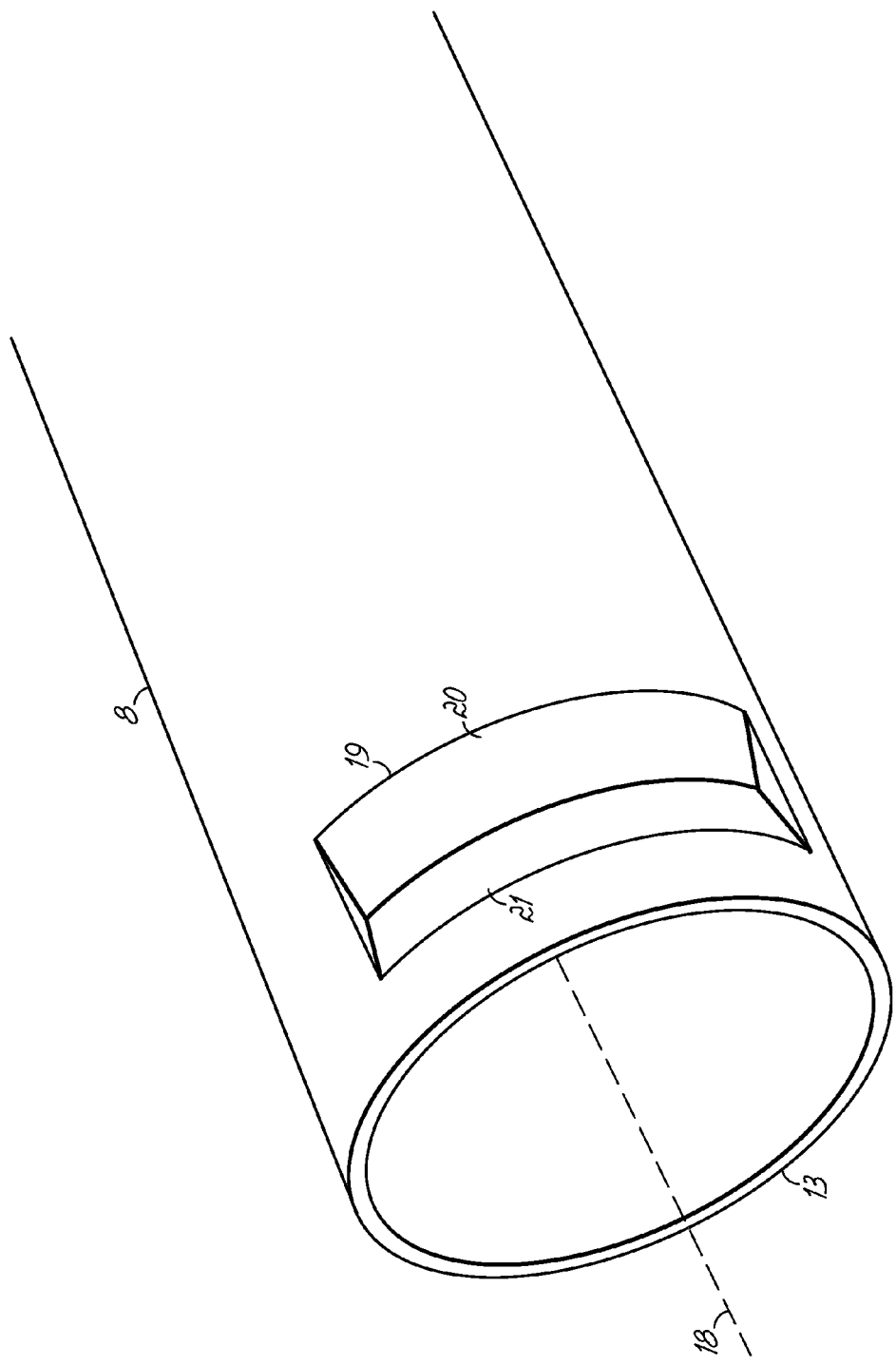
FIG. 7 illustrates the shape of the recess formed in the spar in accordance with a preferred embodiment of the present invention.

FIG. 7 illustrates the shape of the recess 19 in greater detail. The first, cylindrical surface 20 within the recess 19 provides the major attachment surface for the tapered end 22 of the additional elongate web 10, and this causes the tensile and compressive stresses which are transmitted along the additional web 10 to be applied to the spar 8, 8' as shear stresses. A relatively small component of these tensile and compressive stresses is transmitted to the second, conical surface 21 of the recess 19 as tensile and compressive stress.

Figure 8:
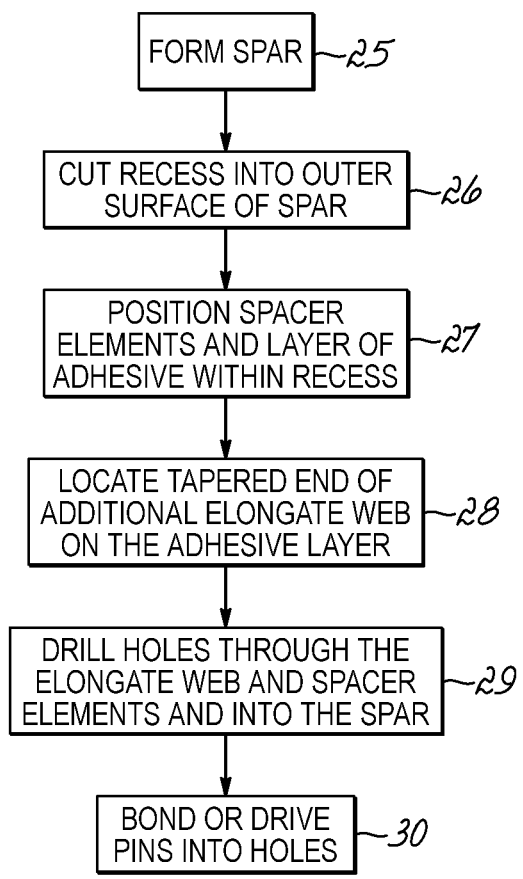
FIG. 8 is a flowchart illustrating the method steps of the preferred embodiment of the present invention.

The steps of the preferred method of the present invention are illustrated in the flowchart of FIG. 8.

A spar is first formed, either in the form of a single integral structure by a winding process, or by joining together using a suitable adhesive a leading edge web, a trailing edge web, a windward cap and a leeward cap at step 25. A recess is then cut into the outer surface of the spar or trailing edge web at step 26. Spacer elements and a layer of adhesive are then positioned within the recess at step 27, and the tapered end of an additional elongate web is then located within the recess on the adhesive layer at step 28. An array of holes are then drilled through the elongate web and the spacer elements and into the spar or trailing edge web at step 29, and finally pins are bonded or driven into the holes at step 30.

Although exemplary embodiments of the present invention have been described above, it will be appreciated that numerous modifications may be made without departing from the scope of the present invention which is defined solely by the appended claims.

The invention claimed is:

1. A method of manufacturing a wind turbine blade, the method comprising:
   providing a spar for the wind turbine blade;
   forming a recess in the outer surface of a root end portion of the spar, wherein at the root end portion of the spar, the spar includes a continuous outer wall that defines a hollow interior, the recess being formed in the outer surface of the outer wall and having a depth that is short of penetrating into the hollow interior; and
   attaching one end of an elongate web within the recess of the spar.

2. The method as claimed in claim 1, wherein the recess is formed by removing a part of the spar.

3. The method as claimed in claim 2, wherein the recess is formed by cutting away the part of the spar.

4. The method as claimed in claim 1, wherein the recess includes a shape defined by a first, substantially cylindrical surface which is substantially coaxial with a longitudinal axis of the root end portion.

5. The method as claimed in claim 4, wherein the shape of the recess is further defined by a second, substantially conical surface formed between the first, cylindrical surface and the outer surface of the root end portion.

6. The method as claimed in claim 5, wherein an area of the first surface of the recess is substantially greater than an area of the second surface of the recess.

7. The method as claimed in claim 4, wherein the elongate web is formed with a tapered root end having a part-cylindrical surface which is complementary to the first, substantially cylindrical surface of the recess in the root end portion of the spar.

8. The method as claimed in claim 1, wherein the elongate web is attached to the spar using an adhesive.

9. The method as claimed in claim 8, further comprising placing sealing elements within the recess so as to enclose the adhesive.

10. The method as claimed in claim 1, wherein the elongate web is attached to the spar using one or more pins.

11. The method as claimed in claim 10, further comprising placing one or more sealing elements within the recess so as to surround the pins after attachment of the elongate web.

12. The method as claimed in claim 11, wherein the one or more sealing elements is provided with a convex edge.

13. The method as claimed in claim 1, further comprising positioning the elongate web within a trailing edge of the blade.

14. The method as claimed in claim 1, further comprising forming a hole in the recess extending further into the root end portion of the spar than the recess, the hole capable of receiving a pin.

15. A method of manufacturing a wind turbine blade, the blade having an outer shell that defines a leading edge, a trailing edge, a windward side, and a leeward side, and a spar, the method comprising:
   forming a recess in an outer surface of a root end portion of the spar, wherein at the root end portion of the spar, the spar includes a continuous outer wall that defines a hollow interior, the recess being formed in the outer surface of the outer wall and having a depth that is short of penetrating into the hollow interior;
   attaching one end of an elongate web within the recess of the spar; and
   positioning the spar relative to the shell such that the elongate web is within the trailing edge of the blade.

16. The method as claimed in claim 15, further comprising forming a hole in the recess extending further into the root end portion of the spar than the recess, the hole capable of receiving a pin.

* * * * *